May 24, 1966  D. R. HERRIOTT ETAL  3,253,226
OPTICAL MASER AMPLIFIER
Filed Sept. 16, 1963  2 Sheets-Sheet 1
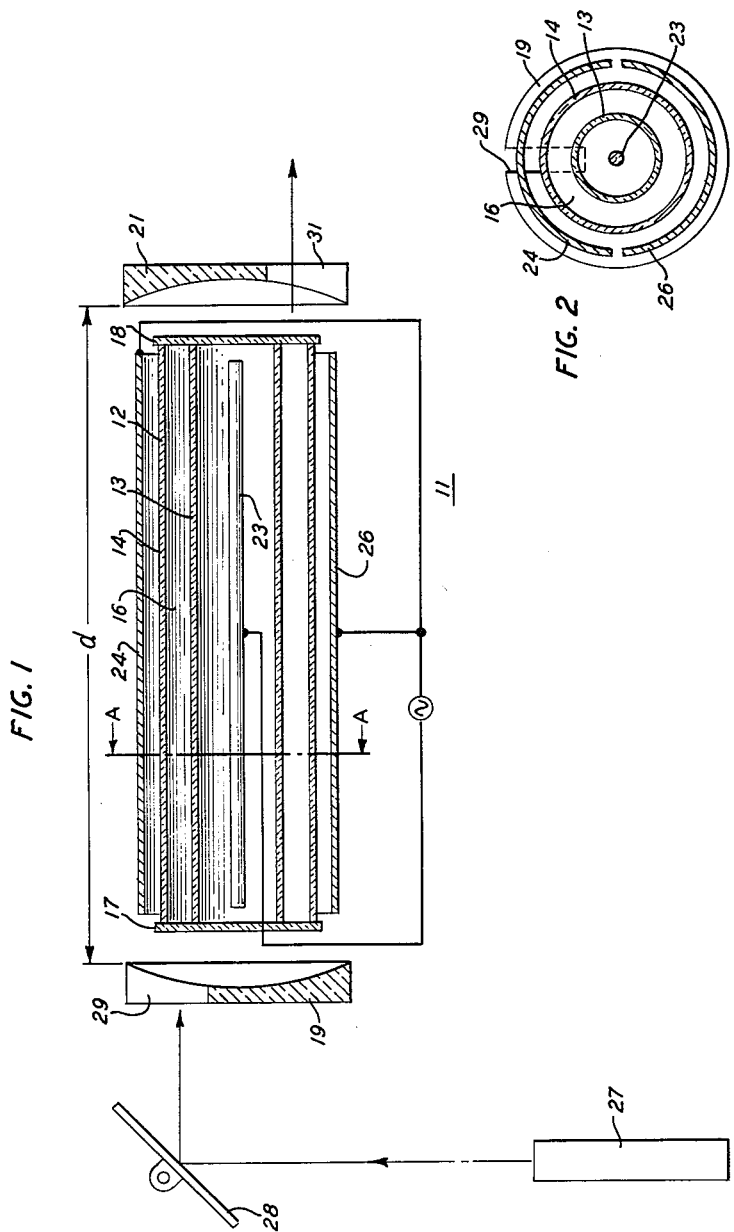
INVENTORS D. R. HERRIOTT
H. W. KOGELNIK
R. KOMPFNER
BY
David P. Kelley
ATTORNEY

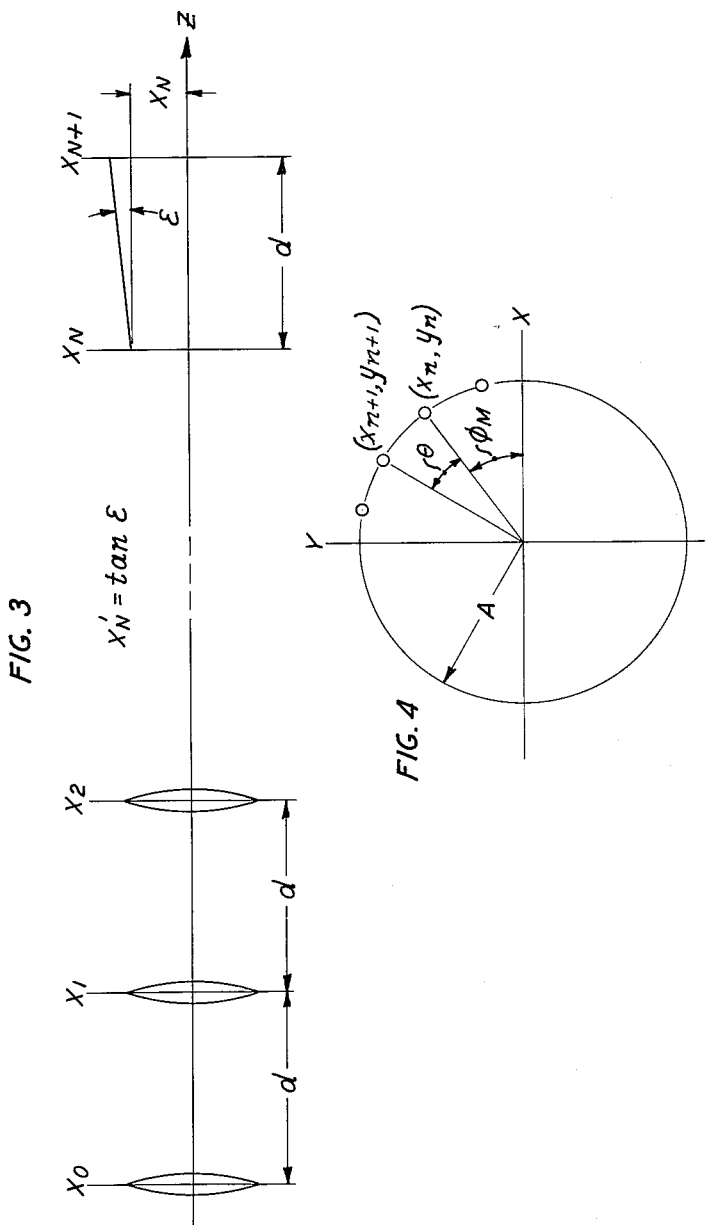

3,253,226
OPTICAL MASER AMPLIFIER
Donald R. Herriott, Morris Township, Morris County, Herwig W. Kogelnik, Summit, and Rudolf Kompfner, Middletown, N.J., assignors to Bell Telephone Laboratories, Incorporated, New York, N.Y., a corporation of New York
Filed Sept. 16, 1963, Ser. No. 309,026
5 Claims. (Cl. 330—4.3)

This invention relates to optical maser devices, and, more particularly, to such devices which utilize spherical mirrors to form a cavity resonator.

In general, optical masers, such as, for example, the gaseous type disclosed in the copending U.S. patent application, Serial No. 277,651 of A. Javan, can be made to produce increased gain by increasing the length thereof. The Q of the resonator formed by reflecting surfaces or mirrors increases with increased length until the diffraction losses become comparable to the reflection losses. Beyond this point, an increase in length results in an actual degradation of performance. One arrangement resulting in lower diffraction losses is a resonator formed by confocal spherical mirrors, as discussed in an article entitled "Resonant Modes in a Maser Interferometer," by Fox and Li, Bell System Technical Journal, vol. XL, No. 2, March 1961, pp. 453–488. Spherical mirrors have the advantage not only of lower diffraction losses, but also of a relative noncriticality of adjustment as opposed to plane mirrors. With an arrangement of confocal spherical mirrors, it is possible to increase the mirror spacing beyond the limits for flat mirrors, and thereby achieve enhanced gain.

In gaseous masers, the gain and power output depends critically upon the degree of proximity of the light rays to the walls of the member or tube containing the gas. Increased gain can be achieved by making the diameter of the tube smaller; however, there are certain obvious practical limits governing how small the diameter may be. For example, there is a limit as to how small the hole may be since diffraction losses increase with a decrease in diameter for a given length.

Most optical masers, whether they utilize flat or curved mirrors, experience the phenomenon of interference caused by the light rays retracing their paths between the mirrors. In general, the rays can make only two passes, or one "round trip" through the active medium before interference occurs. This interference degrades the performance of the maser when it is used as an amplifier of light, because of the creation of resonant peaks.

It is an object of the present invention to produce enhanced gain in an optical maser for particular mirror spacing or tube length.

The present invention is based upon the discovery that a resonator formed by spherical mirrors spaced apart a distance differing from their confocal distance, when illuminated by an off-axis ray of light, produces repeated, noninterfering reflections of the ray, causing it to trace a path which lies, in general, on the surface of a hyperboloid of revolution, with the points of reflection of the ray on the mirrors forming an ellipse. Under certain conditions, depending upon the entrance angle of the illuminating ray, the points of reflection form a circle on the mirrors. As a consequence, the interferometer formed by the mirrors has an effective path length that is several times greater than the actual spacing of the mirrors. The number of points of reflection of the ray upon each mirror which trace out the ellipse or circle is just equal to the factor by which the apparent interferometer spacing exceeds the actual one.

In an illustrative embodiment of the invention, an optical maser amplifier comprises an annular, elongated, tubular member having an active medium confined within the walls of the annulus, placed axially within an interferometer formed by a pair of spaced spherical mirrors, the spacing being other than confocal. In general, "confocal" as applied to a spherical mirror interferometer means that the mirrors are separated by their common radius of curvature. Suitable means for exciting the active medium are provided. Means are provided for directing a beam of light into the maser at a point removed from the axis and at an angle thereto. As will be more apparent hereinafter, the mirror spacing and focal length determine the number of passes or traversals the beam will make through the active medium before it commences to retrace its path, and the angle at which the beam is introduced into the maser determines the shape of the reflection pattern on the mirrors.

In the present illustrative embodiment, means are provided for extracting an amplified beam of light from the maser.

It is a feature of the present invention that the active medium of the maser is contained within and between the walls of an annular, elongated tubular member, which is mounted in a nonconfocal resonator formed by a pair of spherical mirrors preferably having the same radius of curvature.

It is another feature of the present invention that a light beam to be amplified is directed into the maser at a point removed from the axis thereof and generally at an angle thereto.

These and other features of the present invention will be more readily apparent from the following detailed description, taken in conjunction with the accompanying drawings, in which:

FIG. 1 is a sectional view of an illustrative embodiment of the invention;

FIG. 2 is a cross-sectional view of the device of FIG. 1, taken along the line A—A of FIG. 1;

FIG. 3 is a diagram of a lens system equivalent to the mirror system of FIG. 1, for purposes of analysis, and FIG. 4 is a diagram of the reflection pattern of a ray on one of the mirrors, for purposes of analysis and explanation.

Turning now to FIG. 1, there is depicted an optical maser amplifier 11 for amplifying light beam. Amplifier 11 comprises an annular tubular member 12 having concentric inner and outer walls 13 and 14, respectively, which define a space 16 which contains the active medium such as, for example, a helium-neon gas mixture. While the arrangement shown depicts a gaseous type maser, a solid state maser might also be used. For example, an annular ruby rod containing paramagnetic ions as the active medium can be used. Tubular member 12 is terminated at either end by transparent plates 17 and 18. It is to be understood that while, for illustrative purposes, member 12 is shown with end plates 17 and 18, other arrangements may be equally suitable. For example, member 12 may be formed or molded as a single piece of glass closed at its ends.

Tubular member 12 is positioned between and axially aligned with a pair of spherical mirrors 19 and 21 which form an interferometer or cavity resonator, and are spaced from each other a distance $d$, which is different from the confocal distance, i.e., the radius of curvature of the mirrors. Mirrors 19 and 21 preferably have the same radius of curvature, although this is not absolutely necessary.

The active medium contained within the annular space 16 may be excited in a number of ways. In FIG. 1, a source 22 of radio-frequency energy is connected to a rod 23 which is axially aligned with the mirrors 19 and 21, and a pair of plates 24 and 26, which are external to wall 14, and preferably concentric therewith. With this arrangement, a radio-frequency excitation voltage is established across the annular space 16 containing the active medium, and the active medium is excited to produce amplification. If desired, a combination of alternating-current exciting potential and direct-current may be used for exciting a gaseous maser, or, in some cases, direct-current alone may be used. Where the maser amplifier is a solid state device, optical excitation may also be used.

A light beam to be amplified is directed from a source 27, which may be, for example, a helium-neon optical maser, onto an adjustable reflecting member 28 and thence through mirror 19 into maser amplifier 11. In many instances, the light from the optical maser source will have undergone modulation preliminary to the amplification. Member 28 is adjustable to determine the angle and off-axis distance, of the light beam at the point of entrance into maser 11. In order that the light beam is attenuated as little as possible, mirror 19 has a slot 29 through which the beam passes. It is to be understood that other means for introducing the beam to be amplified may be utilized, that shown in FIG. 1 being for purposes of illustration only.

Before discussing the operation of the device of FIG. 1, the following analysis is presented for a better understanding of the phenomena involved.

In terms of ray optics, an interferometer system comprising two spherical, axially aligned mirrors is equivalent to a series of equally spaced lenses, as shown in FIG. 3, having a focal length $f$ and spaced apart a distance $d$. In a Cartesian coordinate system, a paraxial ray passing through such a system of lenses is described in the section between the $n$th and the $(n+1)$th lenses by the coordinates $x_n$, $y_n$ at the point where it intersects the center plane of the $n$th lens, and by the slopes $x_n'$ and $y_n'$ just to the right of this lens, as seen in FIG. 3. For a ray which is injected into the system at the input lens with coordinates $x_0$, $y_0$ and slopes $x_0'$, $y_0'$, it can be shown that $$x_n = x_0 \cos n\theta + \sqrt{\frac{d}{4f-d}}(x_0 + 2fx_0')\sin n\theta \quad (1)$$

where $$\cos \theta = 1 - \frac{d}{2f} \quad (2)$$

A similar relationship holds for $y_n$. In a stable lens system, where $$0 < \frac{d}{f} < 4 \quad (3)$$

Equation 1 can be rewritten as $$x_n = A \sin(n\theta + \alpha) \quad (4)$$

where $$\tan \alpha = \sqrt{\frac{4f}{d} - 1} \Big/ \left(1 + 2f\frac{x_0'}{x_0}\right) \quad (5)$$

and $$A^2 = \frac{4f}{4f-d}(x_0^2 + dx_0 x_0' + df x_0'^2) \quad (6)$$

A is the maximum possible excursion of the ray in the $x$ direction on its way through the series of lenses. Similarly, $$Y_n = B \sin(n\theta + \beta) \quad (7)$$

From Equations 4 and 7, it can be seen that the intersection points of the ray with the lenses, when projected onto an $x$–$y$ plane, lie on an ellipse except where $$A = B \quad (8)$$

and $$\alpha = \beta \pm \frac{\pi}{2} \quad (9)$$

in which case, they lie on a circle of radius A.

From Equations 4 and 5, it is possible to determine the entrance conditions for the beam or ray in order for it to describe a circle. If, for example, $y_0' = 0$, and $x_0$ is specified so that the ray travels in the annular space of the arrangement of FIG. 1, then $$y_0^2 = x_0^2 \left(\frac{4f}{d} - 1\right) \quad (10)$$

$$A^2 = x_0^2 + y_0^2 = \frac{4f}{d} x_0^2 \quad (11)$$

$$x_0' = -\frac{2x_0}{d} = -\frac{A}{\sqrt{fd}} \quad (12)$$

These equations specify the necessary entrance conditions for the ray to describe a circle of radius A.

In FIG. 4, the projections of the intersection points on an $x$–$y$ plane are shown where they lie on a circle of radius A. For this condition, the polar angle $\varphi_n$ for the point $(xn, yn)$ is $$\phi_n = n\theta + \alpha \quad (13)$$

The difference in polar angle between this point and the next intersection point $(x_{n+1}, y_{n+1})$ is angle $\theta$, as defined in Equation 2.

Inasmuch as the lens system of FIG. 3 is the equivalent of the spherical mirror system of FIG. 1, it can be seen that if a ray is injected into the mirror system of FIG. 1 at the angle specified in Equation 12, it will be reflected back and forth between the two mirrors, the point of impact describing a circle on each of the mirrors, with the angular displacement of the adjacent points on either one of the mirrors being $2\theta$. While the ray is reflected back and forth, it stays on the surface of a hyperboloid of revolution. As a consequence, the walls 13 and 14 of the annular structure 12 may be positioned quite close together with their radii such as to encompass the hyperboloid, which, especially in the case of a gaseous maser, results in high gain without increasing diffraction losses resulting from small diameters. Because the spherical mirrors continually refocus the beam, diffraction losses are minimized. In addition, increased gain results from the large number of noninterfering passes through the active medium by the ray. When the resonator dimensions are such that $2\theta$ is an integral fraction $\nu$ of $2\pi$, that is $$2\nu\theta = 2\pi \quad (14)$$

the ray makes $\nu$ return trips through the active medium before it becomes reentrant, that is, before it commences to retrace its path. For the maser amplifier of FIG. 1, it is desirable to extract the ray just prior to its becoming reentrant. To this end, mirror 21 has a slot through which the ray passes after its $(\nu-1)$th passage through the active medium. It is to be understood, of course, that the ray can be extracted at the end of the $\nu$th pass, if desired, or at the end of any particular pass, depending upon the degree of amplification desired.

In general, the structure of FIG. 1, where the mirrors are spaced a distance $d$ apart, is equivalent to a confocal resonator system having a mirror spacing of $\nu d$. It can be seen, therefore, that great reductions in length are possible with no decrease in gain or great increases in gain for a given amplifier length are possible over conventional maser amplifier systems.

While the arrangement of FIG. 1 is an optical maser amplifier for the circular case, it can readily be modified for any one of the more common elliptical cases by constructing walls 13 and 14 to form an elliptical annulus. In the limiting case, for a flattened ellipse, the walls themselves can be a pair of plane members, with no inner wall being necessary. In addition, instead of a pair of cylindrical members forming the annulus, other arrangements are possible, such as a plurality of tubular members arranged in a circle.

The invention, as thus far described, deals with an optical maser amplifier. It is readily apparent that the principles of the invention can be applied to produce an absorption cell, a delay line (resulting from the large number of passes through the maser), or a maser oscillator. In the latter case, the generated ray is allowed to make a multiplicity of passages through the maser so that it retraces itself many times. In such a case, a plurality of resonances occur, as opposed to the single resonance of a single-trip system. These resonances are quite close together and quite stable in a small structure, therefore, as a consequence, a very stable oscillator can be produced.

From the foregoing, it can be seen that the principles of the invention can be utilized to produce a high gain compact maser amplifier having a gain comparable to prior art maser amplifiers of much greater length. Other applications of the principles of the invention will occur to workers in the art without departing from the spirit and scope thereof.

What is claimed is:

1. An optical maser device comprising an elongated, tubular member having an annular cross-section and an active medium contained between the walls of the annulus, a spherical mirror at each end of said member forming a nonconfocal cavity resonator, means for introducing a beam of light into said member at an angle to the axis thereof and removed from said axis, said light beam being multiply reflected by said mirrors and confined between the walls of said annulus, and means for amplifying said beam including means for exciting said active medium.

2. An optical maser device comprising an elongated, tubular member having an annular cross-section and an active medium contained within the annulus, means for exciting said active medium to a higher energy state, means for causing light rays within said device to trace a plurality of noninterfering paths through said active medium comprising a spherical mirror at each end of said tubular member, said mirrors being spaced apart a distance different from their radii of curvature, means for introducing a beam of light into said device at a point removed from the axis thereof for passage through said active medium, and means for extracting a light beam from said tubular member.

3. An optical maser device as claimed in claim 2 wherein said means for introducing said beam includes means for imparting to said beam a slope at the point of entrance defined by $$x_0' = -\frac{2x_0}{d}$$

where $x_0$ is the distance from the axis in the $x$ direction of a Cartesian coordinate system, and $d$ is the distance between the two mirrors.

4. An optical maser amplifier comprising an elongated, tubular member having an annular cross-section and an active medium contained between the walls of the annulus, a spherical mirror at each end of said member, said mirrors being spaced apart a distance differing from their radii of curvature and forming a nonconfocal cavity resonator, means for causing a beam of light to be reflected back and forth between the two mirrors, the points of reflection on each mirror describing a circle, said last-mentioned means comprising means for introducing said beam into the resonator at an angle to the axis thereof and removed from said axis, said beam being confined between the walls of the annulus, the points of reflection on each mirror being separated by an angle $2\theta$ where $$\cos \theta = 1 - \frac{d}{2f}$$

where $d$ is the distance between the mirrors and $f$ is their focal length, and means for amplifying said beam comprising means for exciting said active medium.

5. An optical maser amplifier as claimed in claim 4 wherein the angle $\theta$ is further defined by the relationship $$2\nu\theta = 2\pi$$

where $\nu$ is an integer representing the number of noninterfering passes the beam can make through the active medium, and means for extracting the beam from said resonator before it has made $\nu$ passes.

No references cited.

ROY LAKE, *Primary Examiner.*

D. HOSTETTER, *Assistant Examiner.*